(12) United States Patent
She et al.

(10) Patent No.: US 11,772,508 B2
(45) Date of Patent: Oct. 3, 2023

(54) INTELLIGENT CHARGING CONNECTOR FOR TRANSPORT REFRIGERATION SYSTEM

(71) Applicant: Carrier Corporation, Palm Beach Gardens, FL (US)

(72) Inventors: Xu She, Cohoes, NY (US); Ismail Agirman, Southington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 289 days.

(21) Appl. No.: 17/084,051

(22) Filed: Oct. 29, 2020

(65) Prior Publication Data

US 2021/0129702 A1    May 6, 2021

Related U.S. Application Data

(60) Provisional application No. 62/930,741, filed on Nov. 5, 2019.

(51) Int. Cl.
*B60L 53/62* (2019.01)
*B60H 1/32* (2006.01)

(52) U.S. Cl.
CPC ............ *B60L 53/62* (2019.02); *B60H 1/3208* (2013.01); *B60H 1/3232* (2013.01); *B60L 2200/36* (2013.01)

(58) Field of Classification Search
CPC ...... B60H 1/3232; B60H 1/3208; B60L 53/62
See application file for complete search history.

(56) References Cited

U.S. PATENT DOCUMENTS

| 5,265,435 | A  | 11/1993 | Richardson |
| 6,688,125 | B2 | 2/2004  | Okamoto et al. |
| 6,819,576 | B2 | 11/2004 | Johnson, Jr. |

(Continued)

FOREIGN PATENT DOCUMENTS

| CN | 102310746 A    | 1/2012 |
| WO | 2017218910 A2  | 12/2017 |
| WO | 2018134634 A1  | 7/2018 |

OTHER PUBLICATIONS

European Search Report for Application No. 20206052.1; dated Mar. 30, 2021; 7 Pages.

*Primary Examiner* — Nelson J Nieves
(74) *Attorney, Agent, or Firm* — CANTOR COLBURN LLP (57) ABSTRACT

A transportation refrigeration system including: a transportation refrigeration unit including a compressor, one or more valves, and a controller; an energy storage device configured to provide electrical power to the transportation refrigeration unit; and an intelligent charging connector in electrical communication with the energy storage device and/or the transportation refrigeration unit, the intelligent charging connector being connectable to a power grid and being configured to selectively control a provision of electrical power to the transportation refrigeration unit from the energy storage device and/or the power grid by transitioning the provision of electrical power to the transportation refrigeration unit from being supplied by the energy storage device or the power grid in response to the intelligent charging connector being connected to the power grid or in conjunction with the intelligent charging connector being disconnected from the power grid, respectively.

8 Claims, 6 Drawing Sheets

(56) References Cited

U.S. PATENT DOCUMENTS

| | | | |
|---|---|---|---|
| 8,860,243 B2* | 10/2014 | Hering | B60L 1/00 |
| | | | 307/9.1 |
| 9,464,839 B2 | 10/2016 | Rusignuolo et al. | |
| 9,562,715 B2 | 2/2017 | Kandasamy | |
| 9,586,458 B2 | 3/2017 | Larson et al. | |
| 9,960,609 B2 | 5/2018 | Muralidhar et al. | |
| 10,315,495 B2 | 6/2019 | Vehr et al. | |
| 2007/0131408 A1 | 6/2007 | Zeigler et al. | |
| 2012/0326667 A1* | 12/2012 | Ito | B60L 53/66 |
| | | | 320/109 |
| 2014/0060097 A1 | 3/2014 | Perreault | |
| 2014/0283533 A1 | 9/2014 | Kurtzman et al. | |
| 2018/0001745 A1 | 1/2018 | Vehr et al. | |
| 2018/0111441 A1 | 4/2018 | Menard et al. | |
| 2020/0086712 A1* | 3/2020 | Schumacher | H02J 1/14 |
| 2020/0086744 A1* | 3/2020 | Schumacher | B60L 58/22 |
| 2020/0130471 A1* | 4/2020 | Leasure | B60H 1/00364 |
| 2020/0177008 A1* | 6/2020 | Tiedtke | B60L 1/00 |
| 2020/0247387 A1* | 8/2020 | Mizutani | G06Q 10/04 |
| 2020/0307412 A1* | 10/2020 | Moriya | B60L 50/60 |
| 2022/0250499 A1* | 8/2022 | Takeuchi | B60L 7/24 |

\* cited by examiner

INTELLIGENT CHARGING CONNECTOR FOR TRANSPORT REFRIGERATION SYSTEM

CROSS-REFERENCE TO RELATED APPLICATIONS

This application claims the benefit of Provisional Application No. 62/930,741 filed Nov. 5, 2019, the disclosure of which is incorporated herein by reference in its entirety.

BACKGROUND

The embodiments herein generally relate to transport refrigeration systems and more specifically, the energy management of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transportation refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transportation refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven.

Transport refrigeration systems may also be electrically driven. In an electrically driven transport refrigeration system, components of the transportation refrigeration unit (such as a compressor) can be powered by an electric current supplied by a battery during a "road mode" and an electric current supplied by a power grid during a "standby mode." A "road mode" refers to a mode of operation in which the transport refrigeration system is unconnected to a power grid, such as when a refrigerated vehicle is in transit. A "standby mode" refers to a mode of operation in which the transport refrigeration system is connected to a power grid, such as when a refrigerated vehicle is parked and plugged in to a charging station. It is desirable to maintain the uninterrupted operation of the compressor during the transition from one mode to another, however, conventionally when transitioning from road mode to standby mode there can be a large inrush current if the motor of the compressor is not stopped due to the different voltage and phase between the grid and motor terminal voltage. Likewise, when using conventional methods to transition from the standby mode to the road mode, there can be a power disruption when disconnecting the charging connect from the grid due to the current supplied by the grid. To avoid these problems, a method of smoothly transferring between these two modes is desired to allow uninterrupted operation of the compressor.

BRIEF DESCRIPTION

According to one embodiment, a transport refrigeration system is provided. The transportation refrigeration system including: a transportation refrigeration unit including a compressor, one or more valves, and a controller; an energy storage device configured to provide electrical power to the transportation refrigeration unit; and an intelligent charging connector in electrical communication with the energy storage device and/or the transportation refrigeration unit, the intelligent charging connector being connectable to a power grid and being configured to selectively control a provision of electrical power to the transportation refrigeration unit from the energy storage device and/or the power grid, wherein the intelligent charging connector is configured to transition the provision of electrical power to the transportation refrigeration unit from being supplied by the energy storage device to being supplied by the power grid in response to the intelligent charging connector being connected to the power grid, and wherein the intelligent charging connector is configured to transition the provision of electrical power to the transportation refrigeration unit from being supplied by the power grid to being supplied by the energy storage device in conjunction with the intelligent charging connector being disconnected from the power.

In addition to one or more of the features described above, or as an alternative, further embodiments of the transport refrigeration system may include a power conversion unit configured convert an amplitude, a frequency and a phase of an electrical power signal provided by the energy storage device and/or power grid.

In addition to one or more of the features described above, or as an alternative, further embodiments of the transport refrigeration system may include that the intelligent charging connector includes: a switch configured to connect the transportation refrigeration unit directly to the power grid when the switch is closed; a grid voltage detection unit configured to detect characteristics of an electrical power signal supplied by the power grid, wherein the characteristics include an amplitude, a phase and a frequency of the electrical power signal supplied by the power grid; and a communication unit configured to communicate with the power conversion unit to transmit and receive characteristics of electronic power signals being supplied by the power grid and/or the energy storage.

In addition to one or more of the features described above, or as an alternative, further embodiments of the transport refrigeration system may include that the intelligent charging connector is configured to transmit the characteristics of the electrical power signal supplied by the power grid to the power conversion unit in response to the intelligent charging connector being connected to the power grid and the power conversion unit is configured to, based on the characteristics of the electrical power signal supplied by the power grid, gradually convert characteristics of an electrical power signal supplied from the energy storage device to the transportation refrigeration unit to match the characteristics of the electrical power signal supplied by the power grid.

In addition to one or more of the features described above, or as an alternative, further embodiments of the transport refrigeration system may include that the characteristics of the electrical power signal supplied from the energy storage device include an amplitude, a frequency and a phase of the electrical power signal supplied from the energy storage device.

In addition to one or more of the features described above, or as an alternative, further embodiments of the transport refrigeration system may that the power conversion unit is configured to gradually convert the characteristics of the electrical power signal supplied from the energy storage device to the transportation refrigeration unit at a rate of change that allows for a continuous functioning of the transportation refrigeration unit.

In addition to one or more of the features described above, or as an alternative, further embodiments of the transport refrigeration system may include that the intelligent charging connector is configured to close the switch to directly connect the power grid to the transportation refrigeration unit in response to receiving a communication from the power conversion unit indicating that the characteristics of the electrical power signal supplied from the energy storage device have been converted to match the characteristics of the electric power signal supplied by the power grid.

In addition to one or more of the features described above, or as an alternative, further embodiments of the transport refrigeration system may include that the power conversion unit is configured to supply an electrical power signal to the energy storage device in response to the switch being closed by converting the characteristics of the electrical power signal supplied from the power grid to match characteristics of an electrical power signal required to charge the energy storage device.

In addition to one or more of the features described above, or as an alternative, further embodiments of the transport refrigeration system may include that the power conversion unit is configured to displace the electrical power signal supplied from the power grid to the transportation refrigeration unit with an electrical power signal supplied by the energy storage device that has been converted by the power conversion unit to have characteristics that match the characteristics of the electrical power signal supplied by the power grid in response to receiving a signal indicative of a user's intent to disconnect the intelligent charging connector from the power supply.

In addition to one or more of the features described above, or as an alternative, further embodiments of the transport refrigeration system may include that the intelligent charging connector is configured to open the switch and cause an indication that the intelligent charging connector is ready to be disconnected from the power supply to be displayed for viewing by user in response to the intelligent charging connector receiving an indication from the power conversion unit that the transportation refrigeration unit is being fully powered by an electrical power signal supplied by the energy storage device.

According to another embodiment, a method of transitioning transport refrigeration system from a road mode to a standby mode is provided. The method including: connecting an intelligent charging connector to a power grid that supplies grid power; detecting, by the intelligent charging connector, electrical characteristics of the grid power; communicating the electrical characteristics of the grid power to a power conversion unit; adjusting, by the power conversion unit, electrical characteristics of a power supplied to a compressor from a battery to match the electrical characteristics of the grid power; closing, by the intelligent charging connector, a switch, wherein the closed switch provides a direct connection between the power grid and the compressor; and turning off the power conversion unit to prevent a flow of electrical power from the battery to the compressor.

In addition to one or more of the features described above, or as an alternative, further embodiments of the method of transitioning transport refrigeration system from a road mode to a standby mode may include that the power supplied to the compressor is supplied from the battery to the compressor via the power conversion unit.

In addition to one or more of the features described above, or as an alternative, further embodiments of the method of transitioning transport refrigeration system from a road mode to a standby mode may include that adjusting the electrical characteristics of the power supplied to the compressor to match the electrical characteristics of the grid power includes: gradually adjusting the electrical characteristics of the power supplied to the compressor; and repeatedly checking the electrical characteristics of the power supplied to the compressor until a match with the electrical characteristics of the grid power has been achieved.

In addition to one or more of the features described above, or as an alternative, further embodiments of the method of transitioning transport refrigeration system from a road mode to a standby mode may include that adjusting the electrical characteristics of the power supplied to the compressor comprises changing one or more of an amplitude, phase or frequency of the power supplied to the compressor.

In addition to one or more of the features described above, or as an alternative, further embodiments of the method of transitioning transport refrigeration system from a road mode to a standby mode may include activating the power conversion unit to convert the grid power into a DC power that is appropriate to charge the battery.

According to another embodiment, a method of transitioning transport refrigeration system from a standby mode to a road mode is provided. The method including: operating the transport refrigeration system in the standby mode, wherein the standby mode includes powering a compressor of the transport refrigeration system with grid power via a direct connection from the compressor to a power grid; receiving, by an intelligent charging connector, an indication that a standby mode should end; turning on a power conversion unit that receives power supplied by a battery as an input and supplies an output power to the compressor; gradually adjusting, by the power conversion unit, electrical characteristics of the output power supplied to the compressor to match electrical characteristics of the grid power; and responsive to determining that the power supplied to the compressor from the power conversion unit has completely displaced the power supplied to the compressor from the power grid, causing, by the intelligent charging connector, a switch to be opened to disconnect the direct connection from the compressor to the power grid.

In addition to one or more of the features described above, or as an alternative, further embodiments of the method of transitioning transport refrigeration system from a standby mode to a road mode may include that determining that the power supplied to the compressor from the power conversion unit has completely displaced the power supplied to the compressor from the power grid includes: determining, by the power conversion unit that the power supplied to the compressor from the power conversion unit has completely displaced the power supplied to the compressor from the power grid; and transmitting, from the power conversion unit to the intelligent charging connector, an indication that the power supplied to the compressor from the power conversion unit has completely displaced the power supplied to the compressor from the power grid.

In addition to one or more of the features described above, or as an alternative, further embodiments of the method of transitioning transport refrigeration system from a standby mode to a road mode may include that the electrical characteristics of the output power supplied to the compressor comprise one or more of an amplitude, a phase and a frequency of the output power.

In addition to one or more of the features described above, or as an alternative, further embodiments of the method of transitioning transport refrigeration system from a standby mode to a road mode may include that operating the transport refrigeration system in the standby mode includes charging the battery using the grid power.

In addition to one or more of the features described above, or as an alternative, further embodiments of the method of transitioning transport refrigeration system from a standby mode to a road mode may include that receiving, by an intelligent charging connector, an indication that a standby mode should end includes: determining, by a sensor associated with the battery, that the battery has completed charging; and turning the power conversion unit off.

Technical effects of embodiments of the present disclosure include allowing the smooth transition between different operating modes that allows the continuous uninterrupted operation of the transport refrigeration system by preventing large inrush currents that may otherwise be caused to connecting the transport refrigeration system to the power grid and power interruptions caused by disconnecting from the power grid.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
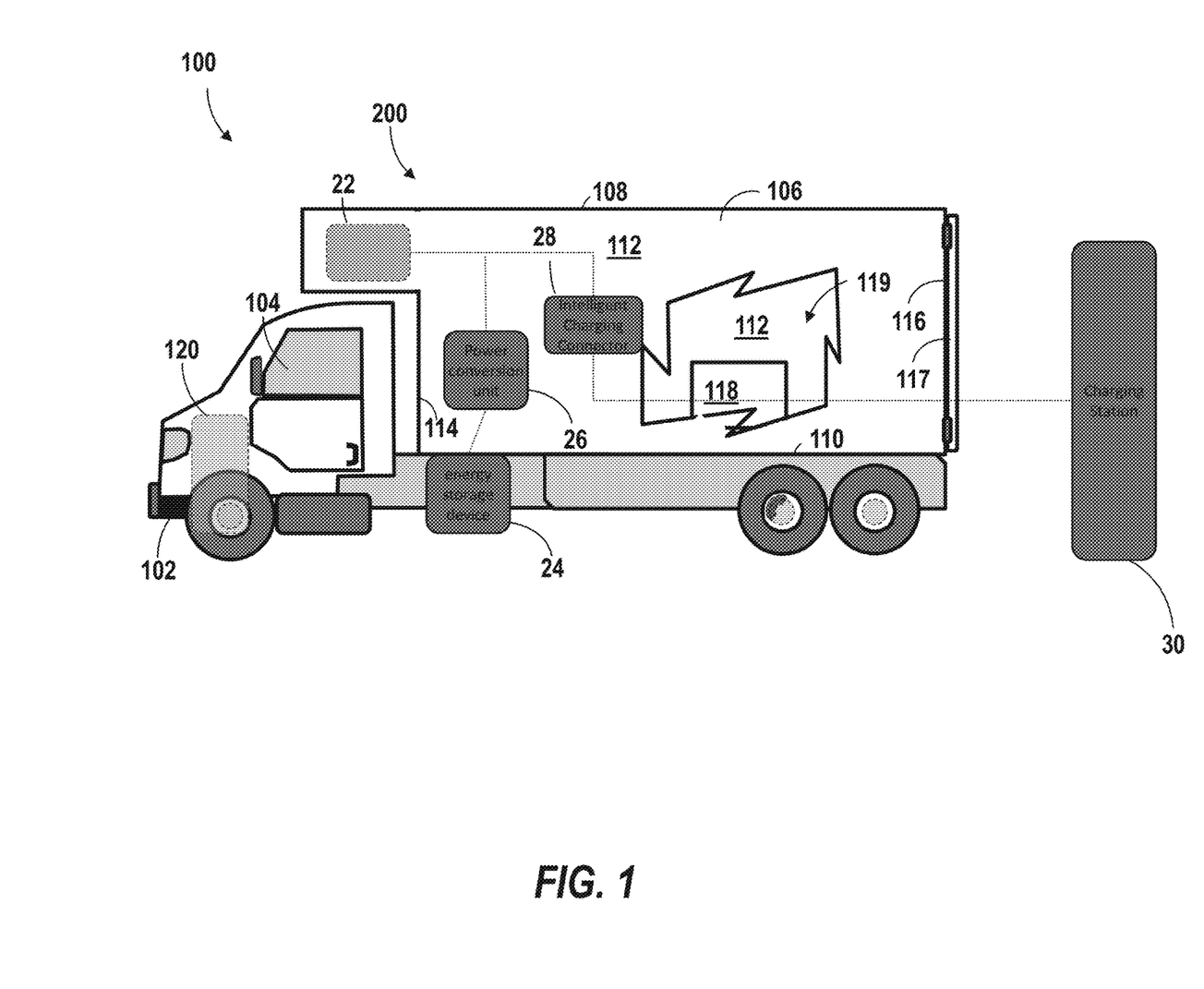
FIG. 1 is a schematic illustration of a transport refrigeration system, according to an embodiment of the present disclosure.
Figure 2A:
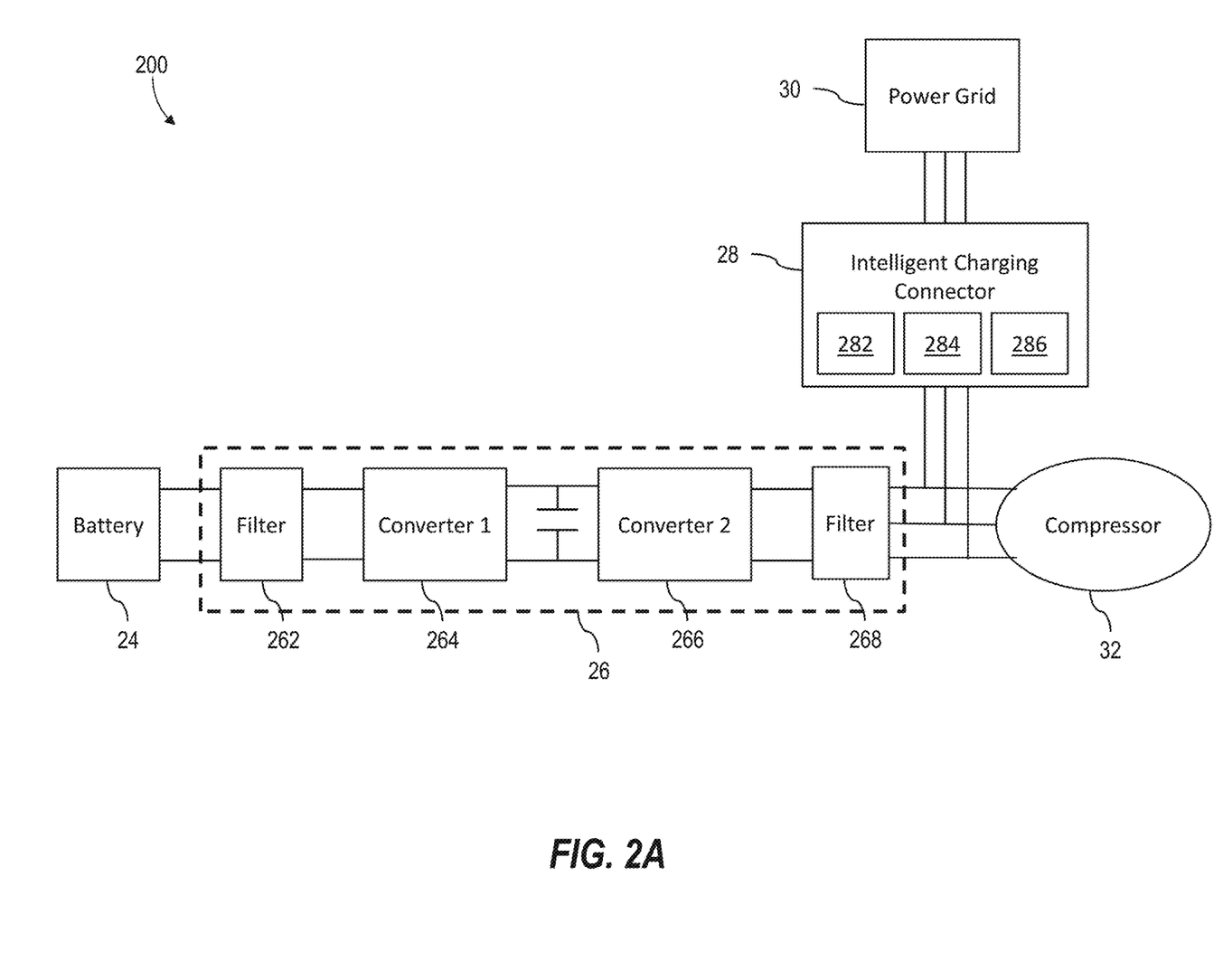
FIG. 2A is a block diagram of an intelligent charging connector integrated with a transport refrigeration system of FIG. 1, according to an embodiment of the present disclosure.
Figure 2B:
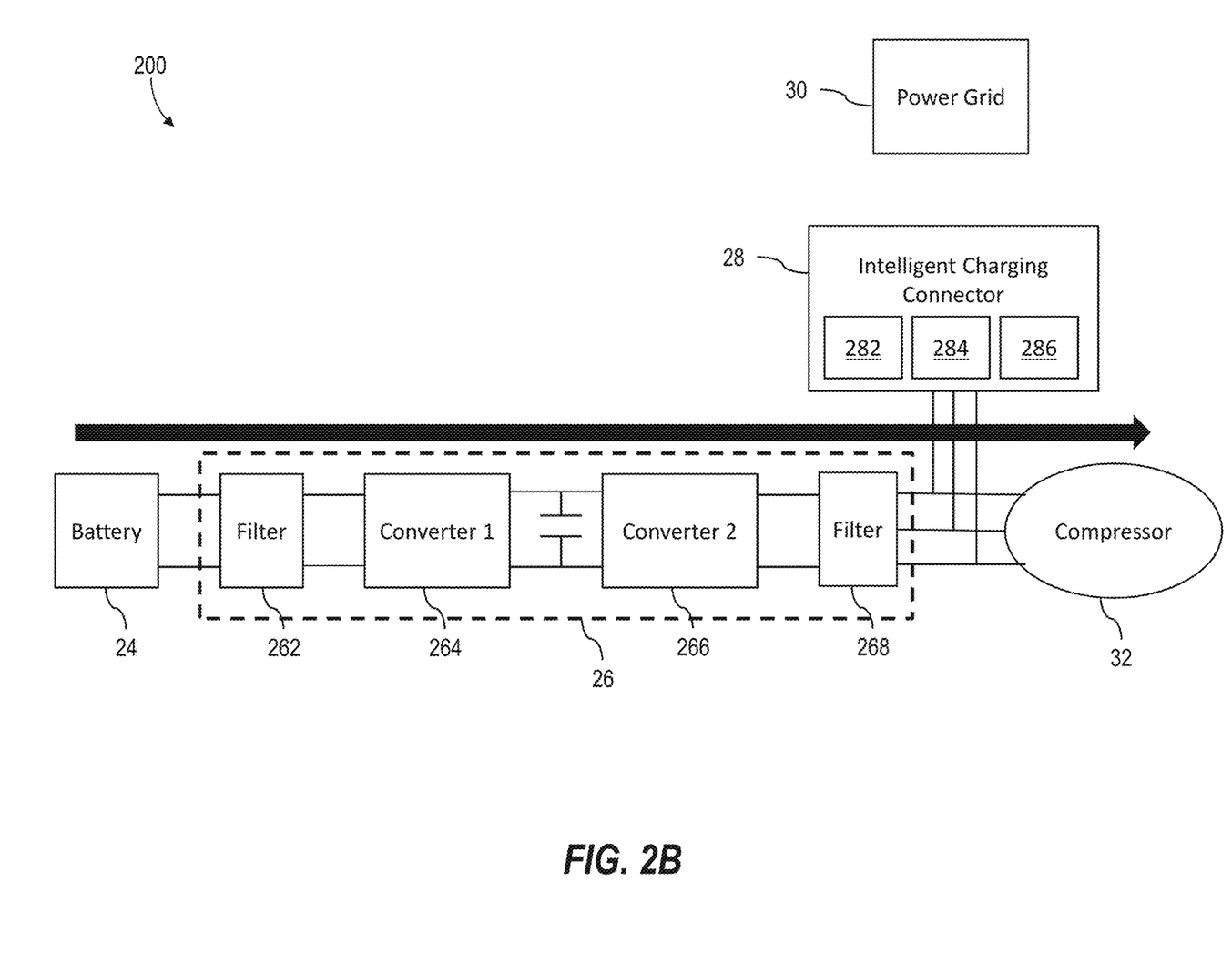
FIG. 2B is a block diagram of an intelligent charging connector integrated with a transport refrigeration system operating in road mode according to an embodiment of the present disclosure.
Figure 2C:
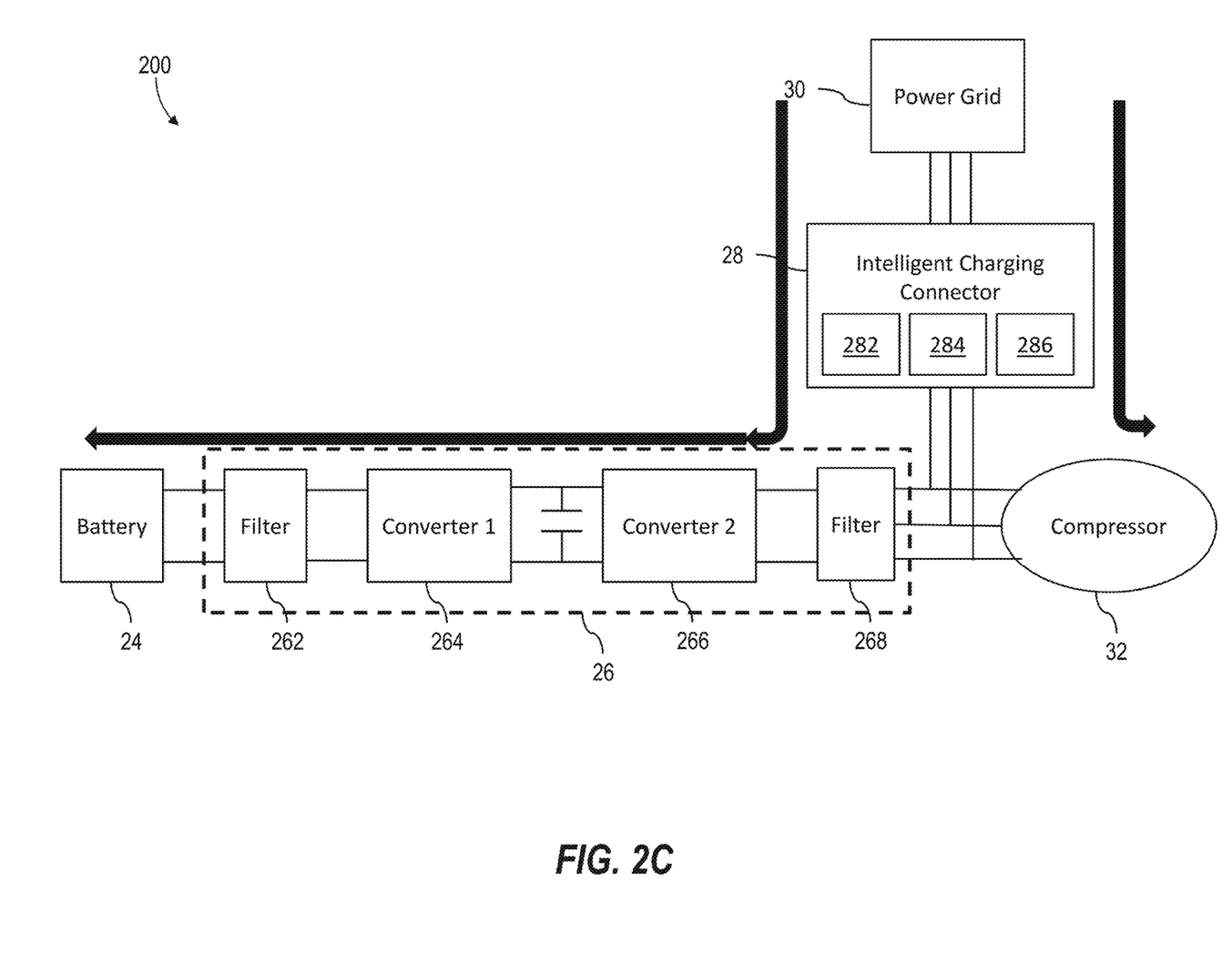
FIG. 2C is a block diagram of an intelligent charging connector integrated with a transport refrigeration system operating in standby mode according to an embodiment of the present disclosure.

Referring to FIGS. 1 and 2A-2C, various embodiments of the present disclosure are illustrated. FIG. 1 shows a schematic illustration of a transport refrigeration system 200, according to an embodiment of the present disclosure. FIG. 2A shows block diagram of an intelligent charging connector 28 integrated with a transport refrigeration system 200 of FIG. 1, according to an embodiment of the present disclosure. FIGS. 2B and 2C show a block diagram of the transport refrigeration system 200 operating in road mode and a block diagram of the transport refrigeration system 200 operating in standby mode, respectively.

The transport refrigeration system 200 is being illustrated as a trailer system 100, as seen in FIG. 1. The trailer system 100 includes a vehicle 102 integrally connected to a transport container 106. The vehicle 102 includes an operator's compartment or cab 104 and a propulsion motor 120 which acts as the drive system of the trailer system 100. The propulsion motor 120 is configured to power the vehicle 102. The energy source that powers the propulsion motor 120 may be at least one of compressed natural gas, liquefied natural gas, gasoline, electricity, diesel, or a combination thereof. The propulsion motor 120 may be an electric motor or a hybrid motor (e.g., a combustion engine and an electric motor). The transport container 106 is coupled to the vehicle 102. The transport container 106 may be removably coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to a tractor-trailer refrigerated system or non-trailer refrigeration such as, for example a rigid truck, a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a transportation refrigeration unit 22, an energy storage device 24, a power conversion unit 26, and an intelligent charging connector 28. The transportation refrigeration unit 22 includes a refrigerant compression device 32 for providing a heat transfer functionality and an electric motor (not shown) for driving the refrigerant compression device 32. The transportation refrigeration unit 22 is in operative association with the refrigerated cargo space 119 and is configured to provide conditioned air to the transport container 106. The transportation refrigeration unit 22 functions, under the control of a controller (not shown), to establish and regulate a desired environmental parameters, such as, for example temperature, pressure, humidity, carbon dioxide, ethylene, ozone, light exposure, vibration exposure, and other conditions in the cargo space 119, as known to one of ordinary skill in the art. In an embodiment, the transportation refrigeration unit 22 is capable of providing a desired temperature and humidity range.

Airflow is circulated into and through the refrigerated cargo space 119 of the transport container 106 by means of the transportation refrigeration unit 22. According to some embodiments, the transportation refrigeration unit 22 can include a refrigerant compression device 32 (which may be referred to simply as compressor 32), a refrigerant heat rejection heat exchanger, an expansion device, and a refrigerant heat absorption heat exchanger connected in refrigerant flow communication in a close loop refrigerant circuit and arranged in a conventional refrigeration cycle. The refrigerant compression device 32 may be a single-stage or multiple-stage compressor such as, for example, a reciprocating compressor or a scroll compressor. The transportation refrigeration unit 22 can also include one or more fans associated with the refrigerant heat rejection heat exchanger and can be driven by fan motor(s) and one or more fans associated with the refrigerant heat absorption heat exchanger and driven by fan motor(s). The transportation refrigeration unit 22 may also include a heater associated with the refrigerant heat absorption heat exchanger. It is to be understood that other components may be incorporated into the refrigerant circuit as desired, including for example, but not limited to, a suction modulation valve, a receiver, a filter/dryer, an economizer circuit. Those of skill in the art will understand the conventional components and functionality provided by the refrigeration unit 22 to circuit airflow into the refrigerated cargo space 119 and as such they will not be shown or described in detail herein. It will be understood that compressor 32 shown in FIG. 2A can be a component of a refrigeration unit 22.

The transportation refrigeration unit 22 can be powered by the energy storage device 24 (which may for simplicity be referred to as battery 24), which provides electrical power to the transportation refrigeration unit 22 during operation of the transport refrigeration system in road mode. Examples of the energy storage device 24 may include a battery system (e.g., a battery or bank of batteries), fuel cells, flow battery, and others devices capable of storing and outputting electric energy that may be direct current (DC). The energy storage device 24 may include a battery system, which may employ multiple batteries organized into battery banks.

The battery 24 may be charged by a stationary charging station 30 such as, for example a wall 48V power outlet, or some other outlet connected to a power grid 30. The charging station 30 may provide single phase (e.g., level 2 charging capability) or three phase AC power to the energy storage device 24. It is understood that the charging station 30 may have any phase charging and embodiments disclosed herein are not limited to single phase or three phase AC power. In an embodiment, the single phase AC power may be a high voltage DC power, such as, for example, 500 VDC.

In one embodiment, the energy storage device 24 is located outside of the transportation refrigeration unit 22, as shown in FIG. 1. In another embodiment, the energy storage device 24 is located within the transportation refrigeration unit 22. The transportation refrigeration unit 22 can have a plurality of electrical power demand loads on the energy storage device 24, including, but not limited to, a motor for compressor 32, a drive motor for a fan associated with a refrigerant heat rejection heat exchanger, a drive motor for a fan associated with a refrigerant heat absorption heat exchanger, or any other such aspects of the transportation refrigeration unit 22 that may require electrical power.

The motor used to power the refrigerant compression device 32 is typically an alternating current (AC) motor, whereas the power supplied by the battery 24 is a DC voltage, therefore a power conversion unit 26 is electrically connected between the battery 24 and the refrigerant compression device 32 to convert power supplied from the battery 24 to the refrigerant compression device 32 from DC to AC. According to some embodiments, as shown in FIG. 2A, the power conversion unit 26 can include a first filter 262 connected to a first converter 264 connected to a second converter 266 that is connected to a second filter 268. According to some embodiments, either or both of the filters 262, 268 can be the same type or different types of filters (e.g., L, LC, LCL, etc.) that are configured to reduce the harmonics of the electrical power. In various embodiments, the first and/or second converters 264, 266 can be an AC to DC rectifier, a DC to AC inverter, an AC to AC voltage/frequency converter, and/or a DC to DC voltage converter. In some embodiments, the first converter 264 can be a DC to DC converter and the second converter 266 can be a DC to AC inverter. According to some embodiments, the first converter 264 can be configured to convert an input DC signal (e.g., input from the battery 24) to an output DC signal of a different voltage (e.g., output to the second converter 266). In some embodiments, the second converter 266 can be configured to convert an input DC signal (e.g., input from the first converter 264) to an output AC signal (e.g., output to the refrigerant compression device 32). FIG. 2B shows that when the transport refrigeration system 200 is in road mode, an electric power signal flows from the battery 24 through the power conversion unit 26, which converts the DC power supplied by the battery 24 to an appropriate AC power for use by the refrigerant compression device 32.

As shown in FIG. 2C, which depicts the power flow of the transport refrigeration system 200 when it is in standby mode, the power conversion unit 26 is also electrically connected to the intelligent charging connector 28, such that AC power supplied by the power grid 30 may be converted to DC power by the power conversion unit 26 to charge the battery 24. Thus, it should be understood that the power conversion unit 26 can also operate in reverse such that the second converter 266 can convert an AC power provided by the power grid 30 to a DC power output to the first converter 264 and the first converter 264 can receive the DC power and output another DC power of a different voltage that is appropriate for charging the battery 24. Further, when in standby mode, the power grid 30 can directly power the compressor 32 via the intelligent charging connector 28 as shown in FIG. 2C.

The power conversion unit 26 can be configured to change one or more electrical characteristics of an input power signal and output a modified signal having modified characteristics. As will be understood by those of skill in the art, the power conversion unit 26 can modify one or more of amplitude, frequency and/or phase of a signal, so that for example, a power signal output by the battery 24 may be changed to have electrical characteristics that are suitable for powering the compressor 32. According to some embodiments, the power conversion unit 26 includes circuitry that enables it to communicate with the intelligent charging connector 28.

As shown in FIGS. 2A-2C, in some embodiments, the intelligent charging connector 28 can receive an input power signal from the power grid 30 when connected to the power grid 30 (e.g., via a power cable of the transport refrigeration system 200 that is plugged into a charging station 30) and may output a signal to the power conversion unit 26 and/or to the compressor 32. The intelligent charging connector 28 includes a grid voltage detection unit 282, a communication unit 284 and a switch 286. The grid voltage detection unit 282 is configured to detect the electrical characteristics (e.g., phase, amplitude, and/or frequency) of an electric power signal output by the power grid 30 to the intelligent charging connector 28. The communication unit 284 is configured to communicate information from the intelligent charging connector 28 to the power conversion unit 26, such as the electrical characteristics of the power signal from the power grid 30 and whether the switch 286 is closed or not. The switch 286 is positioned between the intelligent charging connector 28 and the compressor 32 such that when the switch is closed the power signal supplied from the power grid 30 is directly connected to the compressor 32 and when the switch is open there is no direct connection between the compressor 32 and the power grid 30, but rather the power supplied from the power grid 30 is input into the power conversion unit 26. As will be explained in greater detail below, the intelligent charging connector 28 can allow for the smooth transition between the road mode and the standby mode by supplying information about the power supplied by the power grid 30 (the "grid power") to the power conversion unit 26 to allow it to convert the characteristics of the power supplied to the compressor 32 to match that of the grid power and by selectively opening and closing the switch 286. According to some embodiments, the switch 286 may be a fast switch, which can include one or more semiconductor based switches, mechanical switches, gas based switches or hybrid combination or hybrid of switch types. According to some embodiments, the switching time of the fast switches can be less than 1 micro-second. When transitioning from road mode to standby mode, the power conversion unit 26 can gradually change the electrical characteristics of the power that is supplied by the battery 24 and output by the power conversion unit 26 to the compressor 32 to match the electrical characteristics of the power supplied by the power grid 30. After this gradual conversion is complete, the power conversion unit 26 communicates with the intelligent charging connector 28 to let it know that the power being supplied to the compressor 32 that originates from the battery 24 now matches the characteristics of the power supplied from the power grid 30, at which point intelligent charging connector can cause the switch to close, which provides a direct connection between the power grid 30 and the compressor 32 (i.e., entering standby mode). In this way, the compressor 32 can be switched from battery power to grid power without experiencing a disruptive surge in current. Once the system is standby mode, the power conversion unit 26 can convert power supplied from the power grid 30 to a DC power that is used to charge the battery 24 as shown in FIG. 2C.

According to some embodiments, the intelligent charging connector 28 may include an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

Figure 3:
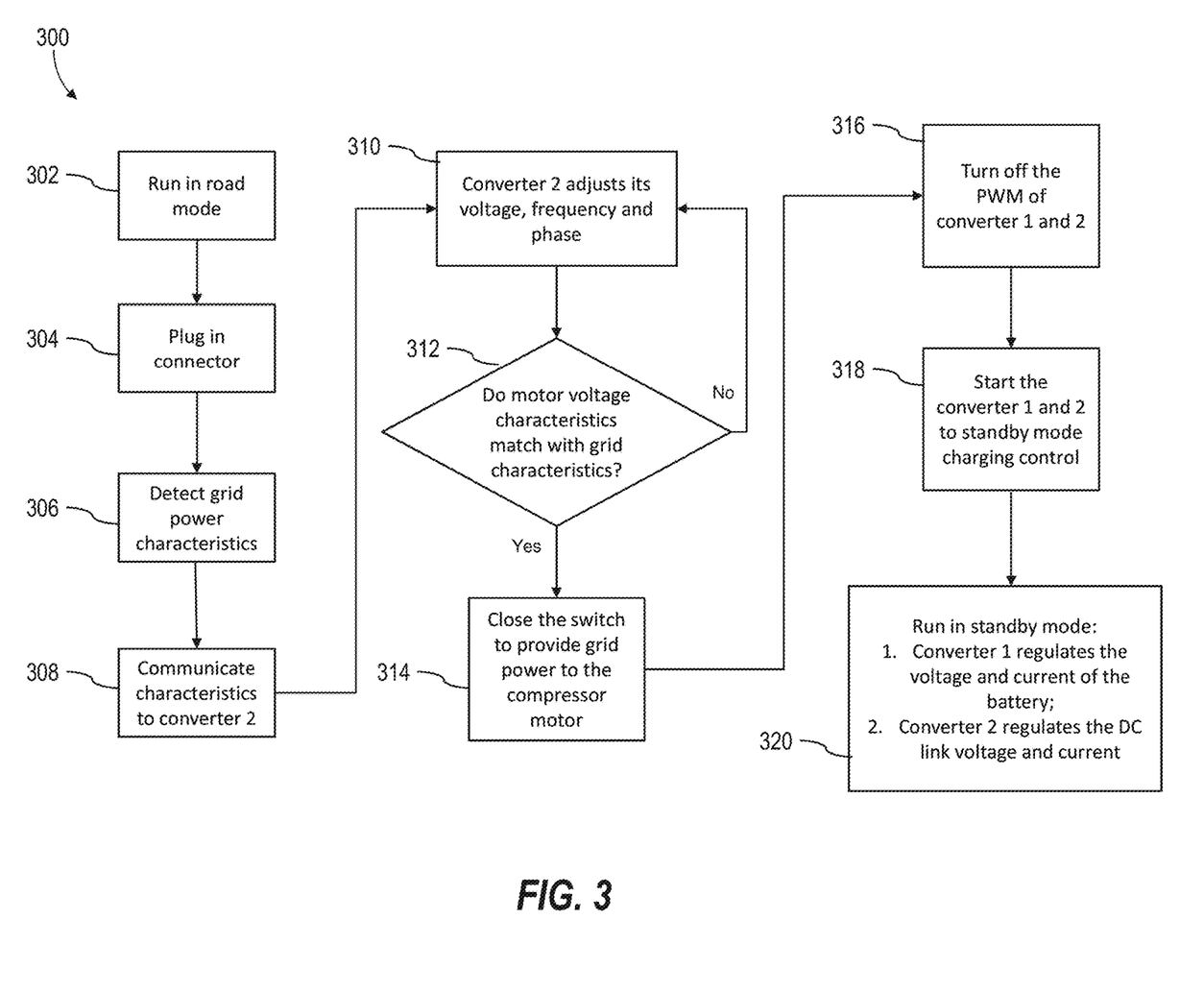
FIG. 3 is a flow process illustrating a method of transitioning the transport refrigeration system of FIG. 2A from a road mode to a standby mode, according to an embodiment of the present disclosure.

Referring now to FIG. 3, with continued reference to FIGS. 1 and 2B. FIG. 3 shows a flow process illustrating a method 300 of transitioning the transport refrigeration system 200 from a road mode to a standby mode, according to an embodiment of the present disclosure.

At block 302, the transport refrigeration system 200 begins by operating in a road mode. For example, the vehicle 102 may be in transit. As described above, in this mode, the compressor 32 is powered by the battery 24.

At block 304, the method includes plugging in the intelligent charging connector 28 to a power source. For example, an operator of the vehicle 102 may park the vehicle and plug an electrical cable that is electrically connected to the intelligent charging connector 28 into a suitable port of a charging station 30.

At block 306, the method includes detecting electrical characteristics of the power supplied by the power grid 30. For example, the grid voltage detection unit 282 of the intelligent charging connector 28 may detect the phase, amplitude and frequency of the power supplied by the power grid 30.

At block 308, the method includes communicating the detected electrical characteristics of the power supplied by the power grid 30 to the power conversion unit 26, and in particular to the second converter 266. For example, the communications unit 284 of the intelligent charging connector 28 may communicate the detected electrical characteristics to the power conversion unit 26. Thus, according to some embodiments, the intelligent charging connector 28 is configured to transmit the characteristics of an electrical power signal supplied by the power grid 30 to the power conversion unit 26 in response to the cable being connected to the power grid 30.

At block 310, the method includes gradually adjusting, by the power conversion unit 26, the electrical characteristics (i.e., amplitude, phase and/or frequency) of the power supplied by the battery 24 to the compressor 32 (via the power conversion unit 26), to match the electrical characteristics of the grid power. According to some embodiments, the power conversion unit 26 is configured to gradually convert the characteristics of the electrical power signal supplied from the battery 24 to the compressor 32 to match the characteristics of the electrical power signal supplied by the power grid. In some embodiments, the power conversion unit 26 is configured to gradually convert the characteristics of the electrical power signal supplied from the battery 24 to the compressor 32 at a rate of change that allows for the continuous (i.e., uninterrupted) functioning of the the compressor 32.

At block 312, the method includes determining whether the motor voltage (i.e., the power being supplied from the power conversion unit 26 to the compressor 32) characteristics matches the electrical characteristics of the grid power. If they do not yet match, the method includes repeatedly continuing to check until they do match. Once the motor voltage characteristics match the grid power characteristics, the method proceeds to block 314.

At block 314, the method includes closing, by the intelligent charging connector 28, the switch 286 to provide a direct connection between the power grid 30 and the compressor 32. According to some embodiments, the intelligent charging connector 28 can close the switch 286 in response to receiving a communication from the power conversion unit 26 that indicates that the characteristics of the electrical power signal supplied from the battery 24 have been converted to match the characteristics of the electric power signal supplied by the power grid 30.

At block 316, the method includes turning off the power conversion unit 26 to prevent the flow of electrical power from the battery 24 to the compressor 32, by, for example, turning off the pulse width modulation (PWM) of the first converter 264 (i.e., ceasing the operation of the first converter 264) and the second converter 266 to cease providing power from the battery 24 to the compressor 32. At this point, the power supplied by the power grid 30 will seamlessly displace the power previously supplied by the battery 24 (via the power conversion unit 26) and the compressor 32 will be completely powered by the grid power without experiencing any disruption to its operation.

At block 318, the method includes activating the power conversion unit 26 (i.e., the first converter 264 and the second converter 266) to convert power supplied by the power grid 30 to a DC power that is appropriate to charge the battery 24. For example, in some embodiments, the power conversion unit 26 may convert grid power that is 480V/60 Hz to a DC power that is 500V. It will be understood that according to various embodiments, the voltage and/or frequency of electric power that the power conversion unit 26 is configured to receive and/or output may differ based on the characteristics of the grid power and operational needs of the battery 24 and/or compressor 32.

At block 320, the method includes operating in standby mode. In some embodiments, operating in standby mode includes the compressor 32 being fully powered by the grid power and the battery 24 being charged by the grid power (i.e., via the power conversion unit 26). According to some embodiments, when in standby mode, the second converter 266 may regulate the DC link voltage and current to convert grid power from AC to DC and the first converter 264 may regulate the voltage and current supplied to the battery 24 in order to charge the battery 24.

Figure 4:
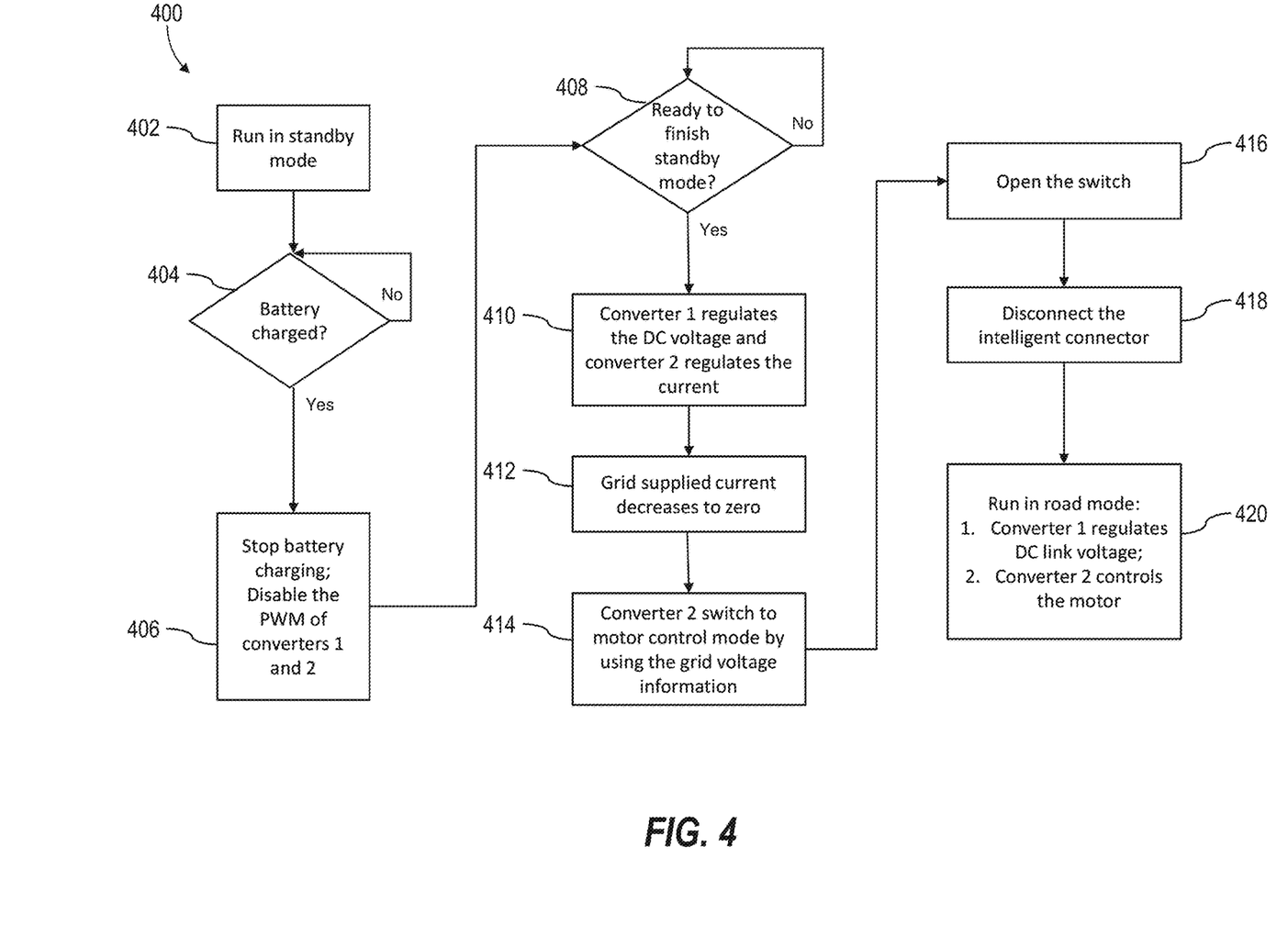
FIG. 4 is a flow process illustrating a method of transitioning the transport refrigeration system of FIG. 2A from a standby mode to a road mode, according to an embodiment of the present disclosure.

Referring now to FIG. 4, with continued reference to FIGS. 1 and 2C. FIG. 4 shows a flow process illustrating a method 400 of transitioning the transport refrigeration system 200 from a standby mode to a road mode, according to an embodiment of the present disclosure.

At block 402, the transport refrigeration system 200 begins by operating in a standby mode. For example, the vehicle 102 may be parked and plugged into a charging station 30. As described above, in this mode, the compressor 32 is powered by the power grid 30 and the power grid 30 may also be used to charge the battery 24.

At block 404, the method optionally includes determining whether the battery 24 is fully charged. According to some embodiments, if the battery 24 is not fully charged, the method includes continuing to charge the battery 24 until it is fully charged.

At block 406, the method includes causing the charging of the battery 24 to stop. According to some embodiments, the battery 24 may include a sensor that determines the amount of charge of the battery 24 and whether it is fully charged or not. In some embodiments, the battery 24 is paired with a communication unit that communicates with the intelligent charging connector 28 to provide a status of the battery 24 charging. Upon receiving a notification that the battery 24 is fully charged, the intelligent charging connector 28 may cause the further charging of the battery 24 to cease. Further, at block 406, the method includes turning off the power conversion unit 26 to prevent the flow of electrical power from the power grid 30 to the battery 24. For example, the pulse width modulation (PWM) of the first converter 264 and the second converter 266 can be turned off in response to an instruction from the intelligent charging connector 28. The PWM can be the pattern of the signal used to turn on/off the power semiconductor device inside the power conversion unit 26, such that when the PWM to a converter is shut off, the converter will cease to operate.

At block 408, the method includes determining whether or not an indication has been provided that standby mode should end. If not, the method continues to perform a check to determine whether an indication has been provided that standby mode should end. According to some embodiments, an indication that standby mode should end may be provided as a user input. For example, if an operator of the vehicle 102 has decided it necessary for the vehicle to enter transit, then the operator may, for example, push a button on a control panel of the vehicle 102 to provide an indication to the intelligent charging connector 28 that it should initiate a transition from standby mode to road mode (i.e., begin transitioning the operation of the compressor 32 off of grid power and onto battery power). According to some embodiments, such as in a case where the vehicle 102 is an autonomous or self-driving vehicle that may be configured to automatically connect and disconnect the intelligent charging connector 28 to and from the power grid 30, an indication that standby mode should end may be provided by a control system of the vehicle 102 in response to, for example a determination by the control system that the vehicle is to initiate transit in the nearby future. If an indication that standby mode should end has been received, the method proceeds to block 412.

At block 410, the method includes turning on the power conversion unit 26 to begin to supply power to the compressor 32 from the battery 24. The first converter 264 can regulate the DC voltage supplied from the battery 24 and the second converter 266 can regulate the current by converting the DC voltage into an AC voltage that is supplied to the compressor 32. In this state, the power conversion unit 26 may be considered to be in a current control mode that allows the second converter 266 to supply current to the compressor 32 in addition to current supplied by the power grid 30. During this state, the terminal voltage of the compressor 32 is determined by the power grid 30. The power conversion unit 26 can be configured to output a power signal to the compressor 32 that gradually increases and has electrical characteristics that match the electrical characteristics of the grid power that is being supplied to the compressor 32 so that power supplied by the battery 24 (via the power conversion unit 26) may be supplied to the compressor 32 to displace power supplied by the power grid 30. In other words, at block 410, the second converter 266 can regulate the current supplied from the battery 24 to the compressor 32 such that the current matches the phase and frequency of the current provided to the compressor 32 from the power grid 30, but the second converter 266 can gradually increase the amplitude of the current supplied from the battery 24 to displace the current provided by the power grid 30.

At block 412, the method involves decreasing the power grid supplied current to the compressor 32 to zero. As will be understood by those of skill in the art, when the power conversion unit 26 is activated, the compressor 32 will be receiving power from both the power grid 30 and the battery 24 (i.e., via the power conversion unit 26). However, as the power supplied from the battery 24 via the power conversion unit 26 (i.e., the output current of the second converter 266) to the compressor 32 gradually increases, it will naturally displace the power supplied to the compressor 32 from the power grid 30 until no power from the power grid 30 is powering the compressor 32.

At block 414, the method includes operating the compressor 32 using power supplied from the battery 24 via the power conversion unit 26. In some embodiments, the second converter 266 can switch from a current control mode to a motor control mode based on the electrical characteristics of the power supplied by the power grid 30. As explained previously, the intelligent charging connector 28 can communicate (e.g., via communication unit 284) the electrical characteristics of the grid power to the power conversion unit 26 and the power conversion unit can then use that information to convert the power supplied by the battery 24 to a power that has characteristics that match that of the grid power so that the battery supplied power can displace the grid power at the compressor 32 without any disruption. During the motor control mode, the ultimate goal is to control the speed of the motor of the compressor 32 in an appropriate manner. According to some embodiments, during motor control mode, the motor terminal voltage of the compressor 32 will depend on the operating point of the system and the reference setting for motor control will be the speed and flux, not the current. The grid power characteristics can be used by the second converter 266 to transition from the current control mode to the motor control mode without any disruption to the operation of the compressor 32 by translating it to the reference for motor control. During motor control mode, the compressor 32 is fully powered by electrical power supplied by the battery 24 (via the power conversion unit 26).

At block 416, the intelligent charging connector 28 can cause the switch 286 to open, severing the direct connection between the power grid 30 and the compressor 32. This will have no effect on the compressor 32, as by this point the compressor 32 is being powered entirely by the battery supplied power that is being converted by the power conversion unit 26 to match the characteristics of the grid power. According to some embodiments, the intelligent charging connector 28 can cause the switch 286 to open in response to receiving a communication from the power conversion unit 26 that the compressor 32 is being entirely powered by the power output by the power conversion unit 26 (i.e., originating at the battery 24). According to some embodiments, the intelligent charging connector 28 is configured to open the switch 286 and cause an indication that the cable is ready to be disconnected from the power supply to be displayed for viewing by user in response to the intelligent charging connector 28 receiving an indication from the power conversion unit 26 that the compressor 32 is being fully powered by an electrical power signal supplied by the battery 24.

At block 418, the method includes disconnecting the cable from the charging station/power grid 30. According to some embodiments, the cable may be manually disconnected by an operator of the vehicle 102. In some embodiments, the vehicle may provide an indication that the cable is ready to be disconnected, such as notification light or sound. According to some embodiments, the intelligent charging connector 28 can cause such a notification to be made in response to receiving a communication from the power conversion unit 26 that the compressor 32 is being powered entirely by the battery 24.

At block 420, the method includes operating the transport refrigeration system in road mode by virtue of the power conversion unit 26 regulating the power supplied to the compressor 32. For example, the first converter 264 can regulate the DC voltage link and the second converter 266 can control the motor of the compressor 32. According to some embodiments, following the disconnection of the cable from the power grid 30, the power conversion unit 26 may gradually adjust the electrical characteristics of the power being supplied to the compressor 32 so that they comport with a predetermined set of road mode electrical characteristics. In this way, following disconnection from the grid power, the battery 24 can smoothly displace the grid power as the source of power to the compressor 32, and then the power supplied to the compressor 32 can be gradually adjusted to return to the desired road mode characteristics (i.e., desired amplitude, phase and frequency). In this way, the intelligent charging connector 28 can smoothly (i.e., without disruption to the continued operation of the transportation refrigeration unit 22) transition of the provision of electrical power to the compressor 32 of the transportation refrigeration unit 22 from being supplied by the battery 24 to being supplied by the power grid 30.

While the above description has described the flow process of FIGS. 3 and 4 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
   a transportation refrigeration unit including a compressor, one or more valves, and a controller;
   an energy storage device configured to provide electrical power to the transportation refrigeration unit; and
   an intelligent charging connector in electrical communication with the energy storage device and/or the transportation refrigeration unit, the intelligent charging connector being connectable to a power grid and being configured to selectively control a provision of electrical power to the transportation refrigeration unit from the energy storage device and/or the power grid; and
   a power conversion unit configured convert an amplitude, a frequency and a phase of an electrical power signal provided by the energy storage device and/or power grid,
   wherein the intelligent charging connector is configured to transition the provision of electrical power to the transportation refrigeration unit from being supplied by the energy storage device to being supplied by the power grid in response to the intelligent charging connector being connected to the power grid,
   wherein the intelligent charging connector is configured to transition the provision of electrical power to the transportation refrigeration unit from being supplied by the power grid to being supplied by the energy storage device in conjunction with the intelligent charging connector being disconnected from the power grid;
   wherein the intelligent charging connector comprises:
   a switch configured to connect the transportation refrigeration unit directly to the power grid when the switch is closed;
   a grid voltage detection unit configured to detect characteristics of an electrical power signal supplied by the power grid, wherein the characteristics comprise an amplitude, a phase and a frequency of the electrical power signal supplied by the power grid; and
   a communication unit configured to communicate with the power conversion unit to transmit and receive characteristics of electronic power signals being supplied by the power grid and/or the energy storage device.

2. The transport refrigeration system of claim 1, wherein the intelligent charging connector is configured to transmit the characteristics of the electrical power signal supplied by the power grid to the power conversion unit in response to the intelligent charging connector being connected to the power grid and the power conversion unit is configured to, based on the characteristics of the electrical power signal supplied by the power grid, gradually convert characteristics of an electrical power signal supplied from the energy storage device to the transportation refrigeration unit to match the characteristics of the electrical power signal supplied by the power grid.

3. The transport refrigeration system of claim 2, wherein the characteristics of the electrical power signal supplied from the energy storage device comprise an amplitude, a frequency and a phase of the electrical power signal supplied from the energy storage device.

4. The transport refrigeration system of claim 2, wherein the power conversion unit is configured to gradually convert the characteristics of the electrical power signal supplied from the energy storage device to the transportation refrigeration unit at a rate of change that allows for a continuous functioning of the transportation refrigeration unit.

5. The transport refrigeration system of claim 4, wherein the intelligent charging connector is configured to close the switch to directly connect the power grid to the transportation refrigeration unit in response to receiving a communication from the power conversion unit indicating that the characteristics of the electrical power signal supplied from the energy storage device have been converted to match the characteristics of the electric power signal supplied by the power grid.

6. The transport refrigeration system of claim 5, wherein the power conversion unit is configured to supply an electrical power signal to the energy storage device in response to the switch being closed by converting the characteristics of the electrical power signal supplied from the power grid to match characteristics of an electrical power signal required to charge the energy storage device.

7. The transport refrigeration system of claim 6, wherein the power conversion unit is configured to displace the electrical power signal supplied from the power grid to the transportation refrigeration unit with an electrical power signal supplied by the energy storage device that has been converted by the power conversion unit to have characteristics that match the characteristics of the electrical power signal supplied by the power grid in response to receiving a signal indicative of a user's intent to unplug the intelligent charging connector from the power supply.

8. The transport refrigeration system of claim 7, wherein the intelligent charging connector is configured to open the switch and cause an indication that the intelligent charging connector is ready to be disconnected from the power supply to be displayed for viewing by user in response to the intelligent charging connector receiving an indication from the power conversion unit that the transportation refrigeration unit is being fully powered by an electrical power signal supplied by the energy storage device.

* * * * *